(12) United States Patent
Cho et al.

(10) Patent No.: US 10,349,247 B2
(45) Date of Patent: *Jul. 9, 2019

(54) TERMINAL DEVICE AND METHOD FOR CONTROLLING THE SAME

(71) Applicant: Samsung Electronics Co., Ltd., Suwon-si, Gyeonggi-do (KR)

(72) Inventors: Hyung-rae Cho, Seoul (KR); Kang-min Lee, Hwaseong-si (KR); Hyun-geun Jo, Seoul (KR); Gi-ppeum Choi, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/922,044

(22) Filed: Mar. 15, 2018

(65) Prior Publication Data

US 2018/0206091 A1 Jul. 19, 2018

Related U.S. Application Data

(63) Continuation of application No. 14/818,842, filed on Aug. 5, 2015, now Pat. No. 9,961,476.

(30) Foreign Application Priority Data

Aug. 6, 2014 (KR) ........................ 10-2014-0101080

(51) Int. Cl.
*H04W 4/00* (2018.01)
*H04W 4/50* (2018.01)
(Continued)

(52) U.S. Cl.
CPC ................ *H04W 4/50* (2018.02); *G06F 8/60* (2013.01); *G06F 9/44* (2013.01); *H04L 65/60* (2013.01);
(Continued)

(58) Field of Classification Search
CPC ... H04W 4/001; H04W 76/023; H04W 12/06; H04M 1/72525; H04L 65/60
(Continued)

(56) References Cited

U.S. PATENT DOCUMENTS 9,164,745 B2 10/2015 Sung et al.
2002/0167956 A1 11/2002 Moysan et al.
(Continued)

FOREIGN PATENT DOCUMENTS

JP 2013-239096 A1 11/2013
KR 10-0715972 B1 5/2007
(Continued)

OTHER PUBLICATIONS

Examination Report dated Sep. 11, 2018, issued in the European Patent Application No. 15829119.5.
(Continued)

*Primary Examiner* — Sam Bhattacharya
(74) *Attorney, Agent, or Firm* — Jefferson IP Law, LLP

(57) ABSTRACT

A terminal device is provided. The terminal device includes a communication interface unit configured to receive image data of an application installed in another terminal device that is streamed from the another terminal device, a display unit configured to display the image data, a control unit configured to receive an installation file associated with the application through the communication interface unit while the image data is being displayed, and to execute the received installation file when authentication of the installation file is completed, and a storage unit configured to allow the application to be installed therein according to execution of the installation file.

12 Claims, 16 Drawing Sheets

(51) Int. Cl.
  *H04L 29/06* (2006.01)
  *H04M 1/725* (2006.01)
  *G06F 9/44* (2018.01)
  *G06F 8/60* (2018.01)
  *H04W 76/14* (2018.01)
  *H04W 12/06* (2009.01)
  *H04W 88/02* (2009.01)

(52) U.S. Cl.
  CPC ...... *H04L 65/604* (2013.01); *H04M 1/72525* (2013.01); *H04W 76/14* (2018.02); *H04M 1/7253* (2013.01); *H04M 1/72544* (2013.01); *H04W 12/06* (2013.01); *H04W 88/02* (2013.01)

(58) Field of Classification Search
  USPC ....... 455/41.1, 41.2, 406, 412.1, 414.1, 418, 455/419; 370/328, 338, 401
  See application file for complete search history.

(56) References Cited

U.S. PATENT DOCUMENTS

| | | |
|---|---|---|
| 2007/0067806 A1 | 3/2007 | Russell et al. |
| 2008/0282295 A1 | 11/2008 | Gabriel et al. |
| 2009/0069051 A1 | 3/2009 | Jain et al. |
| 2010/0153944 A1 | 6/2010 | Qu |
| 2012/0040720 A1 | 2/2012 | Zhang et al. |
| 2013/0132937 A1 | 5/2013 | Sung et al. |
| 2013/0219285 A1 | 8/2013 | Iwasaki |
| 2013/0282564 A1 | 10/2013 | Sibbald |
| 2014/0073370 A1 | 3/2014 | Lee et al. |
| 2014/0080469 A1 | 3/2014 | Ko et al. |
| 2014/0273967 A1 | 9/2014 | Kwon et al. |
| 2014/0304129 A1 | 10/2014 | Colosso et al. |
| 2015/0039685 A1 | 2/2015 | Lewis et al. |
| 2016/0019052 A1 | 1/2016 | Sung et al. |

FOREIGN PATENT DOCUMENTS

| | | |
|---|---|---|
| KR | 10-2009-0107602 A | 10/2009 |
| KR | 10-2013-0054750 A | 5/2013 |
| KR | 10-2013-0127630 A | 11/2013 |
| KR | 10-2014-0032858 A | 3/2014 |

OTHER PUBLICATIONS

Office Action dated Oct. 22, 2018, issued in the Korean Patent Application No. 10-2014-0101080.

TERMINAL DEVICE AND METHOD FOR CONTROLLING THE SAME

CROSS-REFERENCE TO RELATED APPLICATION(S)

This application is a continuation application of prior application Ser. No. 14/818,842, filed on Aug. 5, 2015, which was based on and claimed priority under 35 U.S.C. § 119(a) of a Korean patent application filed on Aug. 6, 2014 in the Korean Intellectual Property Office and assigned Serial number 10-2014-0101080, the entire disclosure of which is hereby incorporated by reference.

TECHNICAL FIELD

The present disclosure relates to a terminal device and a method for controlling the same. More particularly, the present disclosure relates to a terminal device capable of executing an application without installing the application, and a method for controlling the same.

BACKGROUND

Popularization of smartphones has spurred development of application (app) stores for selling software in information communication fields. App stores, replacing existing offline distribution, cover various parts from music albums and movies to even games, and are turning into big systems controlling mobile device environments in line with the advancement of platforms.

However, current app stores, based on a server-client scheme, are models in which every authentication, billing, and data transmission are centralized at a central server. Thus, the related art method has a problem in that users should retrieve a huge amount of data in an overall configuration to search for and purchase a particular app, in addition to a problem of processing centralized traffic.

In addition, if the found app has a large capacity, a long period of time is needed to download the searched app.

In addition, even in a case where the found app is intended to be used only for a short time, the app should be downloaded and installed, and thereafter, the installed app needs to be deleted, thereby causing inconvenience. Moreover, downloading incurs billing.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide an apparatus and method a terminal device capable of executing an application without installing the application, and a method for controlling the same.

Another aspect of the present disclosure is to provide a terminal device capable of executing an application without installing the application, and a method for controlling the same.

In accordance with an aspect of the present disclosure, a terminal device is provided. The terminal device includes a communication interface unit configured to receive image data of an application installed in another terminal device that is streamed from the another terminal device, a display unit configured to display the image data, a control unit configured to receive an installation file associated with the application through the communication interface unit while the image data is being displayed, and to execute the received installation file when authentication of the installation file is completed, and a storage unit configured to allow the application to be installed therein according to execution of the installation file.

The display unit may display an icon for the authentication together at one side of a user interface window displaying the image data.

The storage unit may store the received installation file, and when a preset period of time has lapsed after the installation file was stored, the control unit may delete the installation file.

The communication interface unit may receive the image data and the installation file from the another terminal device in a peer-to-peer (P2P) manner.

The communication interface unit may receive the streamed image data from the another terminal device in a P2P manner, and receive the installation file from a server in a network communication manner.

The terminal device may further include a manipulation input unit configured to receive a manipulation command regarding the image data, and the communication interface unit may transmit the received manipulation command to the another terminal device.

The storage unit may store progress history information of the image data.

When re-connected to the another terminal device, the control unit may transmit the progress history information stored in the storage unit through the communication interface unit, and the another terminal device may stream image data corresponding to the progress history information.

The control unit may drive the application installed in the storage unit based on the progress history information.

When the terminal device is connected to the another terminal device having the application installed therein, the control unit may transmit the progress history information stored in the storage unit through the communication interface unit and the another terminal device may stream image data corresponding to the progress history information.

The control unit may perform authentication by transmitting payment information to a server that sells the application.

In accordance with another aspect of the present disclosure, a terminal device is provided. The terminal device includes a storage unit configured to store an application and an installation file associated with the application, an image generating unit configured to generate image data by driving the application when a streaming request regarding the application is received from another terminal device, a communication interface unit configured to stream the generated image data to the another terminal device and a control unit configured to transmit the installation file to the another terminal device while the image data is being streamed through the communication interface unit.

The terminal device may further include a display unit configured to display the generated image data.

The terminal device may further include a manipulation input unit configured to receive a user manipulation command, wherein the image generating unit may generate first image data corresponding to the manipulation command and second image data corresponding to the streaming request, the display unit may display the first image data, and the communication interface unit may stream the second image data to the another terminal device.

The communication interface unit may receive streaming requests separately from a plurality of other terminal devices, the image generating unit may generate a plurality of image data respectively corresponding to the streaming requests from the plurality of other terminal devices, and the control unit may stream the plurality of generated image data to the plurality of other terminal devices through the communication interface unit, respectively.

The communication interface unit may receive a manipulation command received by the other terminal device from the other terminal device, and the control unit may stream image data corresponding to the manipulation command to the other terminal device through the image generating unit and the communication interface unit.

The communication interface unit may receive a streaming request including progress history information regarding the application, and the image generating unit may generate image data corresponding to the progress history information.

In accordance with another aspect of the present disclosure, a method for controlling a terminal device is provided. The method includes receiving image data of an application installed in another terminal device that is streamed from the another terminal device, displaying the image data receiving an installation file associated with the application while the image data is being displayed, and when authentication of the installation file is completed, installing the received installation file.

In the displaying of the image data, an icon for the authentication may be displayed together at one side of a user interface window displaying the image data.

The method may further include storing the received installation file; and when a preset period of time has lapsed after the installation file was stored, deleting the installation file.

In the streaming, the streamed image data may be received from the another terminal device in a P2P manner, and in the receiving, the installation file may be received in the P2P manner.

In the streaming, the streamed image data may be received from the another terminal device in a P2P manner, and in the receiving, the installation file may be received from a server in a network communication manner.

The method may further include receiving a manipulation command regarding the image data and transmitting the received manipulation command to the another terminal device.

The method may further include storing progress history information of the image data.

The method may further include when re-connected to the another terminal device, transmitting the stored progress history information so that the another terminal device may stream image data corresponding to the progress history information.

The method may further include driving the installed application based on the progress history information.

The method may further include when connected to the another terminal device having the application installed therein, transmitting the stored progress history information so that the another terminal device may stream image data corresponding to the progress history information.

The method may further include transmitting payment information to a server that sells the application and performing authentication.

In accordance with another aspect of the present disclosure, a method for controlling a terminal device is provided. The method includes receiving a streaming request regarding a previously installed application from another terminal device, driving the application to generate image data, streaming the generated image data to the another terminal device, and transmitting a previously stored installation file associated with the application to the another terminal device while the image data is being streamed.

The control method may further include displaying the generated image data.

The control method may further include receiving a user manipulation command.

In the generating of the image data, first image data corresponding to the manipulation command and second image data corresponding to the streaming request may be generated, in the displaying, the first image data may be displayed, and in the streaming, the second image data may be streamed to the another terminal device.

In the receiving, streaming requests may be received separately from a plurality of other terminal devices, in the generating of the image data, a plurality of image data respectively corresponding to the streaming requests from the plurality of other terminal devices may be generated, and in the streaming, the plurality of generated image data may be streamed to the plurality of other terminal devices, respectively.

The method may further include receiving a manipulation command received by the other terminal device from the other terminal device, and in the generating of the image data, image data corresponding to the manipulation command may be generated.

In the receiving, a streaming request including progress history information regarding the application may be received, and in the generating of the image data, image data corresponding to the progress history information may be generated.

In accordance with another aspect of the present disclosure, a non-transitory computer-readable recording medium including a program for executing a method for controlling a terminal device is provided. The method includes receiving image data of an application installed in another terminal device that is streamed from the other terminal device, displaying the image data, receiving an installation file associated with the application and storing the received installation file, while the image data is being displayed, and when authentication of the installation file is completed, installing the received installation file.

In accordance with another aspect of the present disclosure, a non-transitory computer-readable recording medium including a program for executing a method for controlling a terminal device is provided. The method includes receiving a streaming request regarding a previously installed application from another terminal device, driving the application to generate image data, streaming the generated image data to the other terminal device, and transmitting a previously stored installation file associated with the application to the other terminal device while the image data is being streamed.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWING

The above and other aspects, features, and advantages of certain embodiments of the present disclosure will be more apparent from the following description taken in conjunction with the accompanying drawings, in which.

Throughout the drawings, like reference numerals will be understood to refer to like parts, components, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
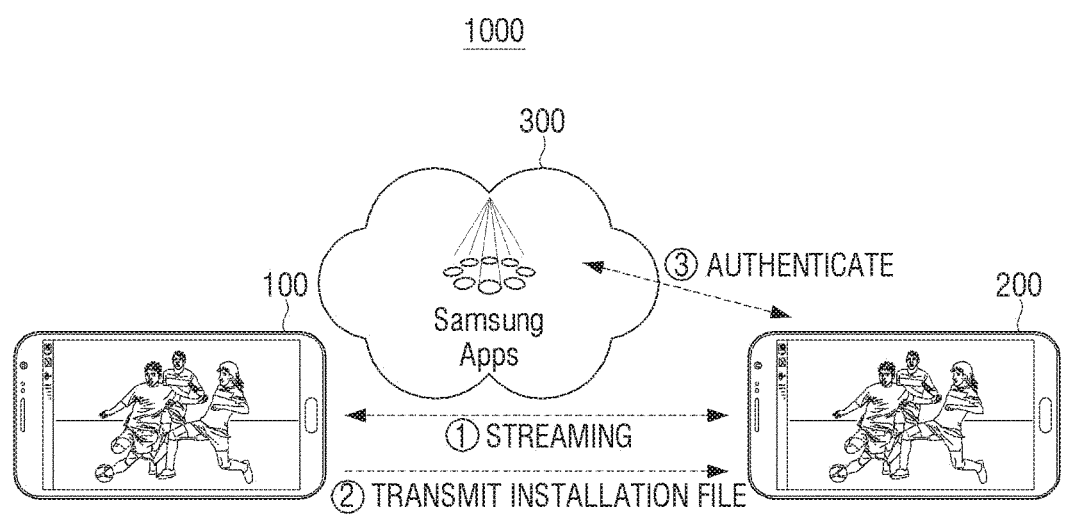
FIG. 1 is a block diagram illustrating a configuration of a network system according to an embodiment of the present disclosure.

FIG. 1 is a block diagram illustrating a configuration of a network system according to an embodiment of the present disclosure.

Referring to FIG. 1, a network system 1000 according to an embodiment of the present disclosure may include a first terminal device 100, a second terminal device 200, and a server 300.

The first terminal device 100, a device including an application installed therein, may generate image data according to the driving of the application and may stream the generated image data to the second terminal device 200.

The first terminal device 100 may also transmit an installation file corresponding to the application to the second terminal device 200. Here, the first terminal device 100 may transmit a store link (e.g., a specific web page address of a server for purchasing the corresponding application) corresponding to the application.

The second terminal device 200 may request streaming of an application installed in the first terminal device 100, receive streamed image data (or an image data stream) provided from the first terminal device 100 in a streaming manner, and display the received image data.

The second terminal device 200 may receive an installation file of the application corresponding to the image data being currently displayed from the first terminal device 100. When installation of the corresponding application is authenticated through the server 300, the second terminal device 200 may install the application by using the received installation file.

The server 300 is a device that authenticates whether an application is allowed to be installed in a terminal device. In detail, when authentication request information is received from the second terminal device 200, the server 300 may perform authentication based on whether payment has been made on the application. The server 300 may be a file server storing an installation file of the application. Meanwhile, when implemented, the server 300 may be implemented as a plurality of servers.

Referring to FIG. 1, the network system 1000 according to the present embodiment may provide an environment in which the user may experience the corresponding application by using the first terminal device 100 even though the application is not installed in the second terminal device 200. Also, while the image data of the application is being played on the second terminal device 200, the installation file of the corresponding application may be obtained from the first terminal device 100, and thus, the user may easily obtain the installation file without separately having to perform searching and downloading on the server. Also, since the server 300 is not involved in transmission of the installation file, a server load may be reduced.

In FIG. 1, the first terminal device 100 and the second terminal device 200 are illustrated as different elements, but the difference between the first terminal device 100 and the second terminal device 200 is merely that in which of them an application is installed in advance, and the first terminal device 100 may operate as the second terminal device 200 and the second terminal device 200 may operate as the first terminal device 100. For example, when the corresponding application is installed in the second terminal device 200 through the aforementioned process, the second terminal device 200 may provide image data regarding the corresponding application to the other terminal device in a streaming manner.

Also, in FIG. 1, it is illustrated that the first terminal device 100 is connected to the single second terminal device 200, but when implemented, a plurality of second terminal devices may be connected to the first terminal device 100. An example thereof will be described with reference to FIG. 8 hereinafter. Also, it is illustrated that the second terminal device 200 is connected to the single first terminal device 100, but when implemented, the second terminal device 200 may be connected to a plurality of first terminal devices 100 to receive a plurality of image data.

When implemented, the devices may also be indirectly connected through a router and another device (for example, a sharer or a server), as well as being directly connected. Also, in the illustrated example, the devices may be connected in a wired manner, as well as in a wireless manner.

Also, in FIG. 1, it is illustrated that the second terminal device 200 receives an installation file from the first terminal device 100, but when implemented, the second terminal device 200 may directly receive an installation file from a server through a store link transferred from the first terminal device 100. This embodiment will be described with reference to FIG. 7 hereinafter.

Also, in FIG. 1, it is illustrated that the first terminal device 100 and the second terminal device 200 display the same image, but images displayed in the first terminal device 100 and the second terminal device 200 may be different according to driving schemes. An example thereof will be described with reference to FIGS. 4 through 6 hereinafter.

Figure 2:
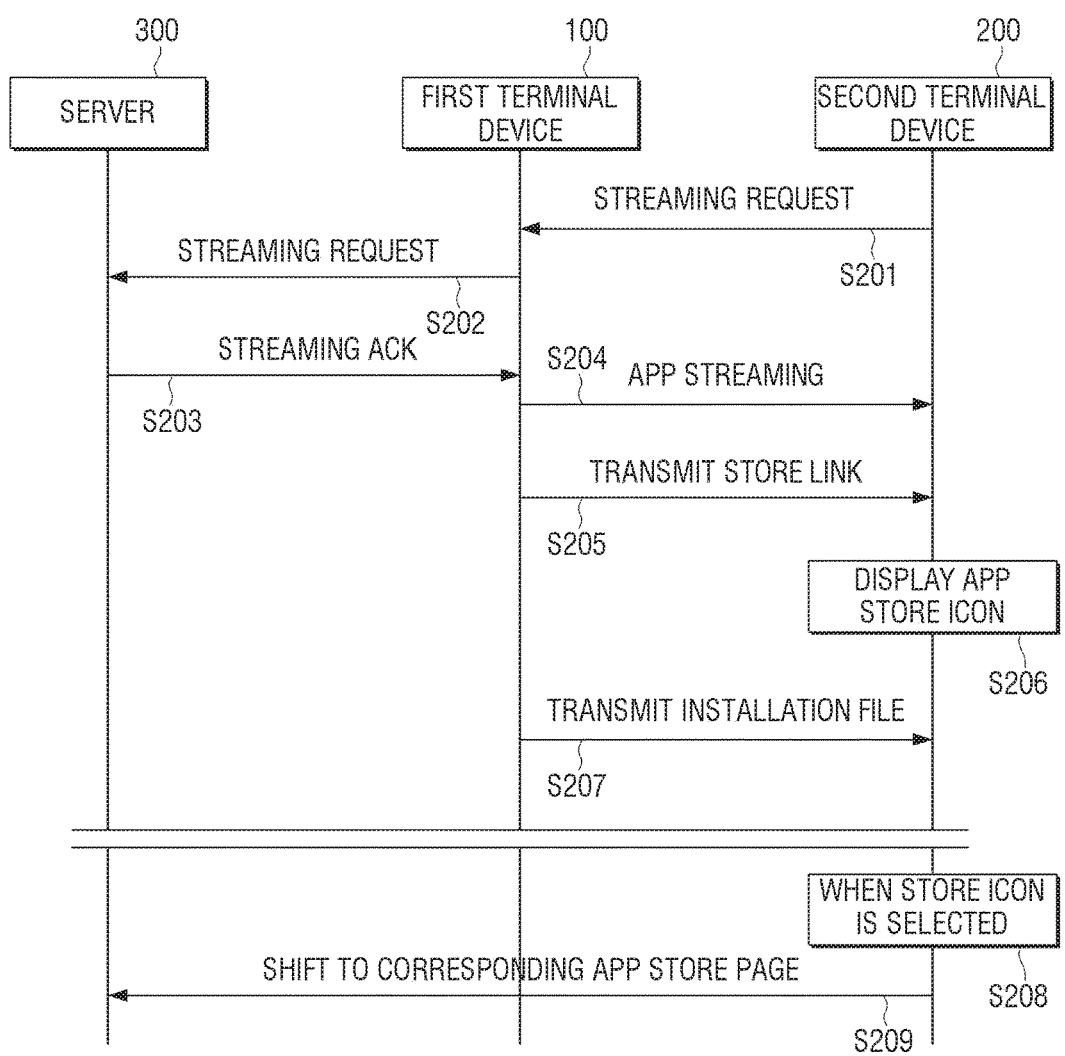
FIG. 2 is a sequence diagram illustrating an application executing method and an application installing method according to an embodiment of the present disclosure.

FIG. 2 is a sequence diagram illustrating an application executing method and an application installing method of the present disclosure.

Referring to FIG. 2, first, the second terminal device 200 requests streaming of an application installed in the first terminal device 100 from the first terminal device 100 at operation S201.

Upon receiving the request, the first terminal device 100 may inquire to the server 300 as to whether it is okay to stream the application to the second terminal device 200 at operation S202, and may receive a response with respect to the inquiry at operation S203.

When a response indicating that it is okay to stream the application is received from the server 300, the first terminal device 100 may drive the application requested by the second terminal device 200, generate image data according to the driving, and stream the generated image data to the second terminal device 200 at operation S204. Here, the streaming may be performed in a peer-to-peer (P2P) manner through a communication scheme such as Wi-Fi direct, near field communication (NFC), or Bluetooth. Here, the P2P scheme refers to the transmission of data without the intermediation of the server 300, and any communication scheme other than Wi-Fi direct, NFC, and Bluetooth may also be used as long as it does not cause traffic in the server 300.

The first terminal device 100 may provide a server link address associated with the corresponding application to the second terminal device 200 at operation S205. The server link address may be provided during the streaming providing process described above or may be provided at an initial stage of the streaming. Also, the first terminal device 100 may provide the server link address through a communication scheme different from the communication scheme used for providing the streaming.

Upon receiving the streamed image data, the second terminal device 200 may display the streamed image data at operation S206. Here, the second terminal device 200 may display an icon for connection to the received server link together.

During the aforementioned streaming process, the first terminal device 100, a source of the image data being currently streamed, may transmit an installation file related to the application to the second terminal device 200 at operation S207. Here, the transmission of the installation file may be performed in a P2P manner using the communication scheme such as Wi-Fi direct, NFC, or Bluetooth. The P2P scheme here also refers to transmission of data without intermediation of the server 300 and any communication scheme other than Wi-Fi direct, NFC, and Bluetooth may also be used as long as it does not cause traffic in the server 300. Meanwhile, when implemented, the same communication scheme or different communication schemes may be used for streaming the aforementioned image data and transmitting the installation file. For example, when the first terminal device 100 and the second terminal device 200 support Wi-Fi direct and Bluetooth, respectively, the streamed image data may be transmitted in the Wi-Fi direct manner and the installation file may be transmitted in the Bluetooth manner.

While the image data is being streamed and displayed, when the user selects an icon displayed on one side of the displayed image data at operation S208, that is, when the user determines to install the current application, the second terminal device 200 may display a web page for purchasing the corresponding application and perform a purchasing operation at operation S209.

When the user purchases the corresponding application, the second terminal device 200 may install the application by using the previously received installation file. Thus, the user of the second terminal device 200 may experience the application installed in the first terminal device 100 in a streaming manner and subsequently access the server 300 to install the corresponding application only through the authentication process without having to search for and download the corresponding application. Here, if selection of the icon for user authentication is input before the receiving of the installation file is completed, the second terminal device 200 may receive the remaining installation file through the server 300 or may receive the entire installation file through the server 300.

In the above descriptions, the image data is streamed uni-directionally, but the image data described above may also be streamed bi-directionally. That is, when the user inputs manipulation (for example, input of a specific key, adjustment of a play time, a manipulation command corresponding to a relevant application) regarding displayed image data, the corresponding manipulation may be transmitted to the first terminal device 100 and the first terminal device 100 may generate image data corresponding to the transmitted manipulation command and stream the generated image data.

For example, when an application installed in the first terminal device 100 is a game application, the first terminal device 100 may generate image data regarding the game application and stream the generated image data to the second terminal device 200. Also, the first terminal device 100 may receive a user's manipulation command from the second terminal device 200, generate image data reflecting the corresponding manipulation command, and stream the generated image data to the second terminal device 200.

In the above descriptions, only the game application is used as an example of an application installed in the first terminal device 100, but when implemented, an environment in which the user of the second terminal device 200 may experience various applications such as an application related to video play, an application related to music play, or an application for office work may also be installed in the first terminal device 100 in the aforementioned streaming manner may be provided.

Meanwhile, in FIG. 2, it is described that only when authentication regarding the corresponding application is properly performed through the server 300, the corresponding application is installed. However, if the application being currently streamed is an application distributed for free, the aforementioned authentication process may be omitted. In this case, operations S202 and S203 described above may be omitted.

Figure 3:
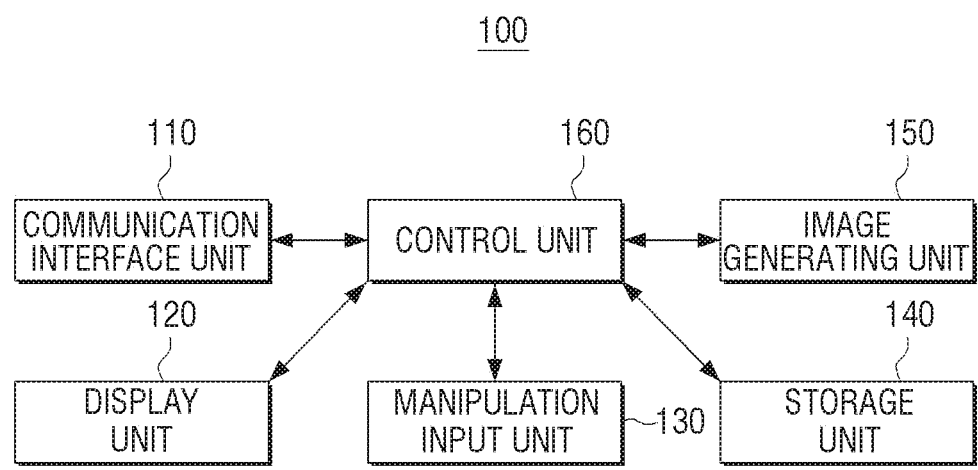
FIG. 3 is a view illustrating a specific configuration of a terminal device of FIG. 1 according to an embodiment of the present disclosure.

FIG. 3 is a view illustrating a specific configuration of the first terminal device 100 of FIG. 1 according to an embodiment of the present disclosure. The configuration of the first terminal device 100 described below may be the same as the configuration of the second terminal device 200.

Referring to FIG. 3, the first terminal device 100 according to the present embodiment may include a communication interface unit 110, a display unit 120, a manipulation input unit 130, a storage unit 140, an image generating unit 150, and a control unit 160. The first terminal device 100 may be a smartphone, a notebook computer, a portable multimedia player (PMP), a moving picture experts group phase 1 or phase 2 (MPEG-1 or MPEG-2) audio layer-3 (MP3) player, a smart television (TV), or a wearable device (e.g., a smart watch).

The first terminal device 100 according to the present embodiment may operate as the second terminal device 200, as well as operate as the first terminal device 100 of FIG. 1. Thus, hereinafter, although it is described that the elements of the first terminal device 100 support all of the functions of the first terminal device 100 and the second terminal device 200, the elements of the first terminal device 100 may be changed to perform only the functions of the first terminal device 100 or only the functions of the second terminal device 200.

The communication interface unit 110 may be formed to connect the first terminal device 100 to an external device (specifically, another terminal device and a server), and here, the communication interface unit 110 may be connected to the external device through a local area network (LAN) and the Internet or through a wireless communication scheme (for example, Bluetooth, Wi-Fi, Wi-Fi direct, global system for mobile communication (GSM), universal mobile telecommunications system (UMTS), long term evolution (LTE), or wireless broadband (WiBro)).

The communication interface unit 110 may communicate with the second terminal device 200. In detail, the communication interface unit 110 may search for the second terminal device 200 therearound, and request streaming of an application installed in the second terminal device 200. Also, the communication interface unit 110 may receive a request for streaming an application installed in the first terminal device 100 from the second terminal device 200. Such a request for streaming may be received from a plurality of other terminal devices, as well as from a single other terminal device.

Here, the request for streaming may include progress history information. For example, when the first terminal device 100 has experienced an application through another terminal device (not shown) so it has progress history information, the communication interface unit 110 may request streaming from the second terminal device 200 by including previously stored progress history information.

The communication interface unit 110 may stream image data to the second terminal device 200 or may receive streamed image data from the second terminal device 200. In detail, when a request for streaming is received from the second terminal device 200, the communication interface unit 110 may stream image data generated by the image generating unit 150 (to be described hereinafter) to the second terminal device 200. Also, when the communication interface unit 110 requests streaming from the second terminal device 200, the communication interface unit 110 may receive streamed image data from the second terminal device 200.

When requests for streaming are received from a plurality of second terminal devices 200, the communication interface unit 110 may stream single image data to the plurality of second terminal devices 200 or may separately stream a plurality of image data to the second terminal devices 200, respectively.

The communication interface unit 110 may transmit or receive an installation file associated with the corresponding application during streaming. In detail, in a case in which image data is being streamed to the other terminal 200, the communication interface unit 110 may provide the installation file to the second terminal device 200 in a P2P manner. On the other hand, when image data is being streamed from the second terminal device 200, the communication interface unit 110 may receive the installation file from the second terminal device 200 in the P2P manner.

The installation file may be transmitted using the same communication scheme as that used to perform streaming, or may be transmitted using another communication scheme. For example, streaming of the image data may be performed in a Wi-Fi direct manner, while transmission and reception of the installation file may be performed in a Bluetooth manner.

The communication interface unit 110 may transmit or receive information regarding an application. In detail, in a case in which the image data is being streamed to the second terminal device 200, the communication interface unit 110 may provide information regarding the corresponding application to the second terminal device 200. On the other hand, when image data is being streamed from the second terminal device 200, the communication interface unit 110 may receive information regarding an application from the second terminal device 200. Here, the information regarding the application may include address information (e.g., a uniform resource locator (URL) address) on a web store for installation of the corresponding application or purchase information (e.g., price).

The communication interface unit 110 may transmit or receive a manipulation command regarding the image data being streamed. In detail, when image data is being streamed to the second terminal device 200, the communication interface unit 110 may receive manipulation information input to the second terminal device 200 from the second terminal device 200. On the other hand, when image data is being streamed from the second terminal device 200, the communication interface unit 110 may transmit a manipulation command received from the manipulation input unit 130 (to be described hereinafter) to the second terminal device 200.

The communication interface unit 110 may communicate with the server 300. In detail, performing communication with the server 300, the communication interface unit 110 may be permitted to provide streaming to the other terminal device or obtain authentication for installation of a new application from the server 300. Also, the communication interface unit 110 may receive an installation file from the server 300 in a network manner.

The display unit 120 may display various types of information supported by the first terminal device 100. The display unit 120 may be a monitor such as a liquid crystal display (LCD) or a cathode-ray tube (CRT), or may be implemented as a touch screen able to simultaneously perform a function of the manipulation input unit 130 to be described hereinafter.

The display unit 120 may display a list of applications installed in the first terminal device 100. The display unit 120 may display an execution screen according to the driving of an application.

The display unit 120 may display a screen for receiving streaming or display a screen for selecting another terminal device to which the display unit 120 is to provide streaming. Here, the display unit 120 may display information regarding applications installed in the second terminal device 200 that may be connected.

The display unit 120 may display a screen for selecting an operation to be performed with the previously selected second terminal device 200. In detail, the display unit 120 may display a screen for selecting whether to receive streamed image data from the previously selected second terminal device 200 or whether to provide streaming.

The display unit 120 may display image data corresponding to driving of an application. In detail, the display unit 120 may display the image generated by the image generating unit 150 (to be described hereinafter). Meanwhile, when image data is being streamed to the second terminal device 200, the image data displayed on the display unit 120 may be the same as or different from the image data being streamed.

Also, the display unit 120 may display streamed image data received through the communication interface unit 110. Here, the display unit 120 may display an icon for authenticating (or installing) an application corresponding to the currently streamed image data, in a portion of the corresponding image data. Also, while displaying the streamed image in a region of a user interface window, the display unit 120 may display information regarding the received application (for example, information created by a distributor of the corresponding application, review information, or price information) together in other region of the user interface window.

In response to user selection of the foregoing icon, the display unit 120 may display a screen for authentication or display of a web page of a server corresponding to the application.

The display unit 120 may display progress of the installation of the application. When the installation of the application is completed, the display unit 120 may display an indication that installation is completed. Also, when the receiving of the installation file is completed during the aforementioned streaming process, the display unit 120 may display that the receiving of the installation file has been completed. In this case, the display unit 120 may display the completion of the reception of the installation file by using an icon displayed together with the streamed image data. For example, in a case in which the installation file is being received, the display unit 120 may display an application (app) store connection icon, and when receiving of the installation file is completed, the display unit 120 may switch the app store connection icon to display an icon for requesting authentication.

The manipulation input unit 130 includes a plurality of function keys for the user to set or select various functions supported by the first terminal device 100. The manipulation input unit 130 may be implemented as a device such as a mouse or a keyboard, and may also be implemented as a touch screen for performing the aforementioned functions of the display unit 120.

The manipulation input unit 130 may receive an application driving command. In detail, the user may drive an application to be provided to the second terminal device 200.

The manipulation input unit 130 may receive a streaming provision command or streaming reception command. Such a manipulation may be received through a control command window displayed when a preset region of the screen is scrolled, or may be received through a separate control list.

The manipulation input unit 130 may receive selection of the second terminal device 200 to which streaming is to be provided or from which streaming is to be received.

The manipulation input unit 130 may receive a manipulation command regarding image data being displayed. Here, when the display unit 120 is displaying an image streamed from the second terminal device 200, the received manipulation command may be transmitted to the second terminal device 200. Also, when the display unit 120 is displaying the image data generated by the image generating unit 150 (to be described hereinafter), the received manipulation command may be transferred to the image generating unit 150.

The manipulation input unit 130 may receive an installation command regarding the application being currently streamed. Also, the manipulation input unit 130 may receive authentication information for installing the corresponding application.

The storage unit 140 stores a program for driving the first terminal device 100. In detail, the storage unit 140 may store a program, a set of various command languages used for driving the first terminal device 100. Here, the program includes an operating program for driving an application, as well as an application (or an application program) for providing a specific service.

The storage unit 140 stores an installation file received through the communication interface unit 110. The installation file may be a file which has been received while the aforementioned image data was being streamed or may be a file which has been received from the server 300.

In the storage unit 140, an application is installed according to execution of the corresponding installation file. Even though the application is installed, the corresponding installation file is stored in a preset region.

The storage unit 140 stores progress history information. Here, the progress history information is information regarding a progress of image data provided from the second terminal device 200. When the corresponding application is a game application, the progress history information may be game progress information, and when the corresponding application is an image application, the progress history information may be information regarding a play time (or play frame), or the like.

The storage unit 140 may temporarily store the image data received through the communication interface unit 110. The storage unit 140 may be implemented as at least one of an internal storage medium and an external storage medium of the first terminal device 100, for example, a removable disk including a universal serial bus (USB) memory, or a web server through a network.

The image generating unit 150 may generate image data through driving of the application. Meanwhile, when progress history information is received from the second terminal device 200 or when a manipulation command is received, the image generating unit 150 may generate image data based on the received progress history information and the manipulation command.

The image generating unit 150 may generate a plurality of image data. In detail, an image to be displayed in the first terminal device 100 and an image to be provided to the second terminal device 200 should be different, the image generating unit 150 may separately generate first image data regarding an application received through the manipulation input unit 130 and second image data regarding an application requested by the second terminal device 200. On the other hand, when streaming is requested by a plurality of second terminal devices 200, the image generating unit 150 may generate image data corresponding to the request of each of the second terminal devices 200.

The control unit 160 controls the elements of the first terminal device 100. In detail, when a streaming request is received from the second terminal device 200, the control unit 160 may drive an application requested by the second terminal device 200 and control the image generating unit 150 and the communication interface unit 110 described above such that image data according to the driving of the corresponding application is streamed to the second terminal device 200.

Meanwhile, when progress history information is included in the streaming request received from the second terminal device 200 or a manipulation command regarding the image data streamed from the second terminal device 200 is received, the control unit 160 may control the image generating unit 150 and the communication interface unit 110 to generate image data corresponding to the received progress history information or the manipulation command and streamed.

On the other hand, when transmission of image data is requested by a plurality of second terminal devices 200, the control unit 160 may control the image generating unit 150 and the communication interface unit 110 to generate a plurality of image data corresponding to the requests and streamed to the plurality of second terminal devices 200, respectively.

The control unit 160 may control the communication interface unit 110 to transmit an installation file associated with the corresponding application to the second terminal device 200 during the aforementioned streaming process. Meanwhile, in a case in which the storage unit 140 does not have an installation file associated with the application, the control unit 160 may generate a file associated with the corresponding application, as an installation file using an image duplication scheme, or the like, and control the communication interface unit 110 to transmit the generated installation file.

When image data is streamed from the second terminal device 200, the control unit 160 may control the display unit 120 to display the streamed image data.

When an installation file is received from the second terminal device 200 while the streamed image data is being received, the control unit 160 may store the received installation file in the storage unit 140. When the user does not input an installation command regarding the application until the streaming is terminated, the control unit 160 may delete the installation file which has been previously received and stored in the storage unit 140.

Meanwhile, when an installation command regarding the application is received from the user before the receiving of the installation file is completed, the control unit 160 may receive the entire installation file associated with the corresponding application again or may receive a remaining portion thereof from the server 300.

According to a user's installation command of the application, the control unit 160 may perform authentication on the installation file from the server 300. In detail, the control unit 160 may transmit payment information (or user authentication information) to a server that purchases an application to perform authentication.

When the authentication is completed, the control unit 160 may install the application in the storage unit 140 through execution of the installation file. When the application is installed in the storage unit 140, the control unit 160 may provide streaming of the image data as described above to the second terminal device 200 with respect to the installed application.

Meanwhile, when a driving command regarding the application installed according to the aforementioned process is received through the manipulation input unit 130, the control unit 160 may control the image generating unit 150 to generate image data based on the progress history information previously stored in the storage unit 140. Accordingly, the user may use the installed application under the same condition as that of an execution environment of the application performed in the streaming manner.

The first terminal device 100 according to the present embodiment described above may provide an environment in which an application may be experienced without having to install the application or may be provided with such an environment, and thus, user convenience may be enhanced. In addition, since the installation file of the application is transmitted during the experiencing process, the user may install the experienced application without separately having to search or download the application from the server.

Also, in FIG. 3, the image generating unit 150 and the control unit 160 are illustrated and described as separate elements, but when implemented, the function of the image generating unit 150 and the function of the control unit 160 may be implemented as a single element.

Figure 4:
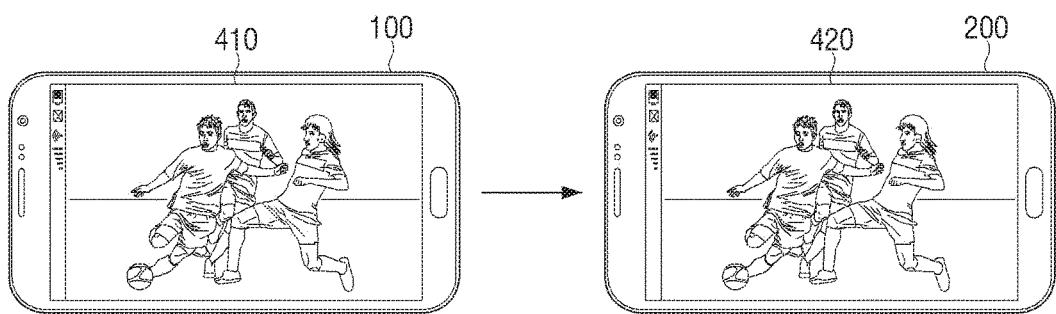
FIGS. 4, 5, and 6 are views illustrating various streaming schemes according to various embodiments of the present disclosure.
Figure 5:
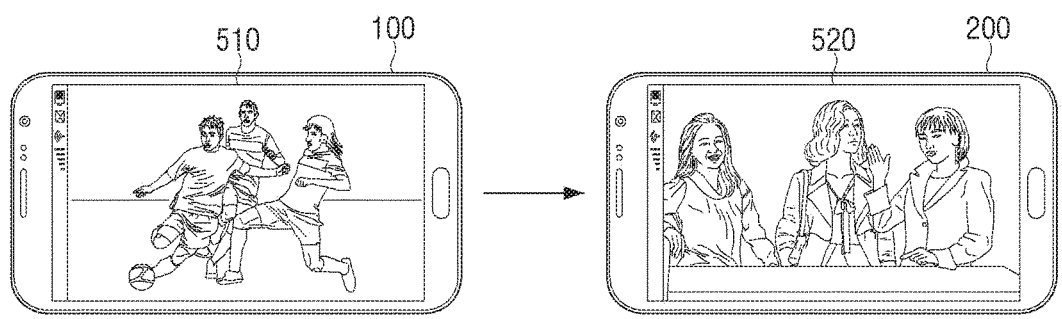
Figure 6:
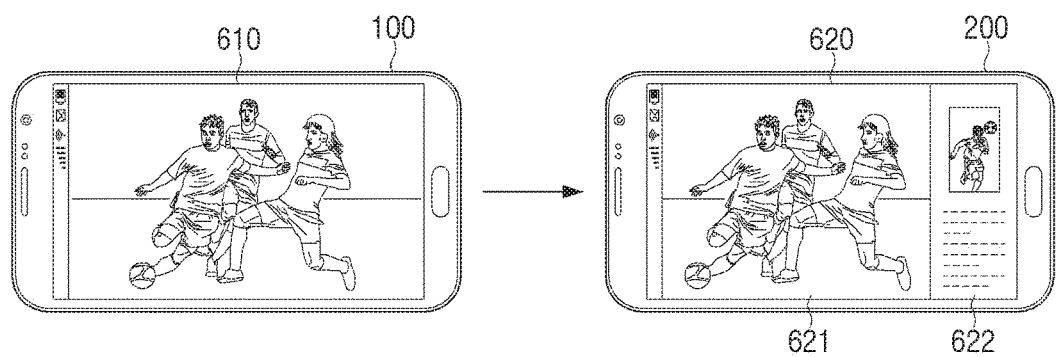

FIGS. 4 through 6 are views illustrating various streaming schemes.

Referring to FIG. 4, the first terminal device 100 and the second device 200 display the same image. In detail, the first terminal device 100 generates an image 410 according to the driving of an application and displays the generated image 410. Also, the first terminal device 100 streams the generated image 410 to the second terminal device 200.

The second terminal device 200 may display an image 420 streamed from the first terminal device 100. Such a streaming scheme may be called a mirroring scheme, which may be applied to a case of streaming a digital multimedia broadcasting (DMB) viewing application or an image play application to the second terminal device 200.

Referring to FIG. 5, the first terminal device 100 and the second terminal device 200 display different images. In detail, the first terminal device 100 generates an image 510 according to the driving of a first application and displays the generated image 510. The first terminal device 100 may generate an image 520 according to the driving of a second application and stream the generated image 520 to the second terminal device 200. Meanwhile, in the above descriptions, different applications are driven to generate a plurality of images, but when implemented, a plurality of images may be generated through the driving of a single application (for example, a game application in which mutual views are different).

Such a streaming scheme may be applied to every application, and in particular, it may be applied to a game application performed by a plurality of users participating therein.

Referring to FIG. 6, the first terminal device 100 and the second terminal device 200 display similar images. In detail, the first terminal device 100 generates an image 610 according to the driving of an application and displays the generated image 610. The first terminal device 100 transmits information regarding a corresponding application together. Thus, the second terminal device 200 may display the image data transmitted in a streaming manner on the left side 621 of the displayed user interface window 620, and display the received information regarding the application on the right side 622 of the user interface window 620.

Figure 7:
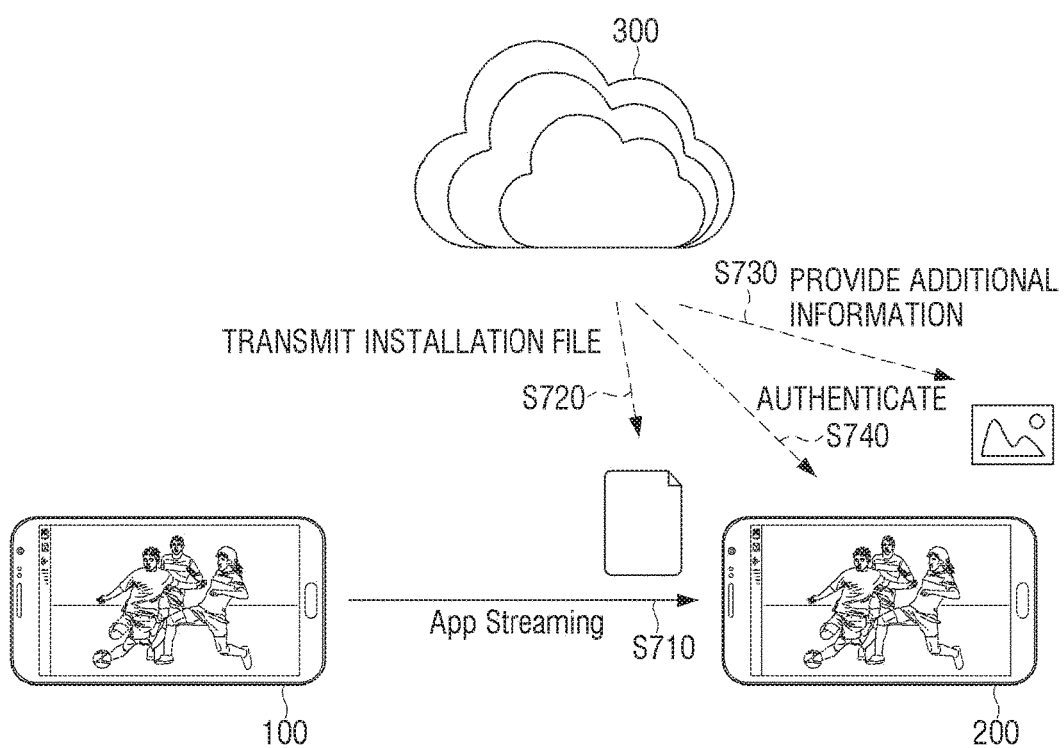
FIG. 7 is a view illustrating an application installing method according to an embodiment of the present disclosure.

FIG. 7 is a view illustrating an application installing method according to another embodiment of the present disclosure.

Referring to FIG. 7, the first terminal device 100, in which an application is installed, may generate image data according to the driving of the application and stream the generated image data to the second terminal device 200 at operation S710.

Here, the first terminal device 100 may transmit a store link (a specific web page address of the server for purchasing the corresponding application) corresponding to the application.

The second terminal device 200 may display the image data streamed from the first terminal device 100 and receive an installation file from the server 300 through the received store link at operation S720.

The second terminal device 200 may receive additional information (for example, distribution description information, billing cost, or review information) regarding the corresponding application while the installation file is being received (or before or after the installation file is received) at operation S730.

When an installation command regarding the currently displayed application is received from the user, the second terminal device 200 may perform authentication through the server 300 at operation S740, and when the authentication is completed, the second terminal device 200 may install the application using the installation file previously received from the server 300.

Figure 8:
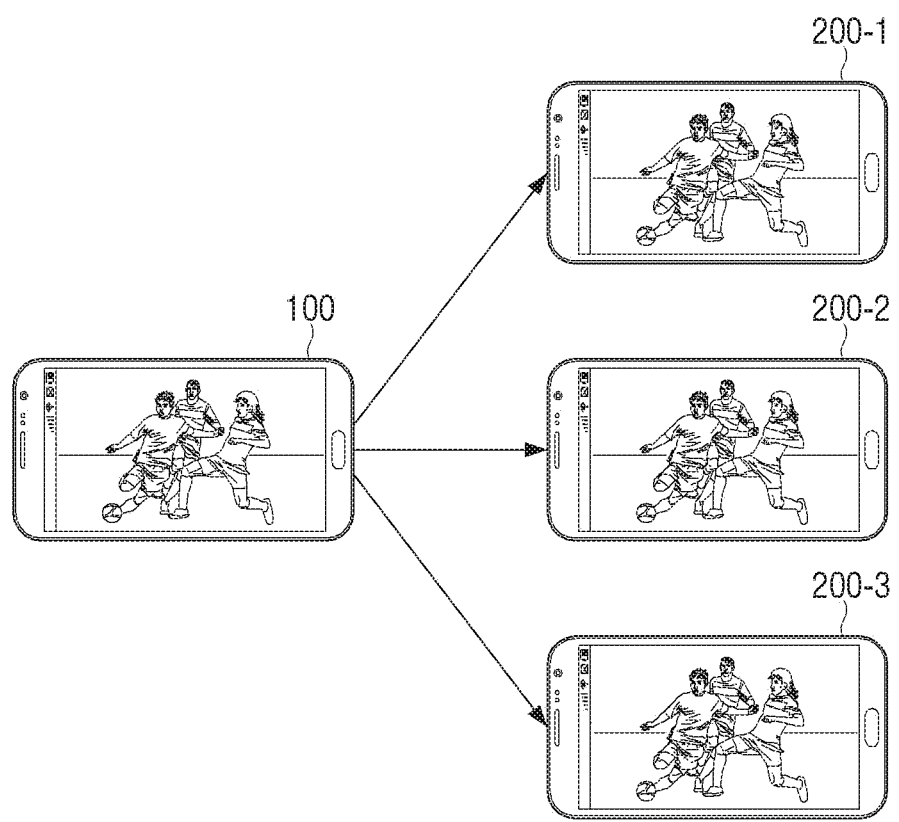
FIG. 8 is a view illustrating a streaming scheme according to an embodiment of the present disclosure.

FIG. 8 is a view illustrating a streaming scheme according to another embodiment of the present.

Referring to FIG. 8, a single first terminal device 100 is connected to a plurality of second terminal devices 200-1, 200-2, and 200-3. The first terminal device 100 may receive streaming requests separately from the plurality of second terminal devices 200-1, 200-2, and 200-3, and may provide image data corresponding to each of the streaming requests to the plurality of second terminal devices 200-1, 200-2, and 200-3. In the illustrated example, the plurality of second terminal devices 200-1, 200-2, and 200-3 display the same image, but when implemented, the plurality of second terminal devices 200-1, 200-2, and 200-3 may separately receive different streamed images and display the received images. Also, as described above with reference to FIG. 5, screens displayed on the first terminal device 100 and the plurality of second terminal devices 200-1, 200-2, and 200-3 may also be different.

FIGS. 9 through 14 are views illustrating examples of a user interface window that may be displayed on a display unit of FIG. 3 according to an embodiment of the present disclosure.

Figure 9:
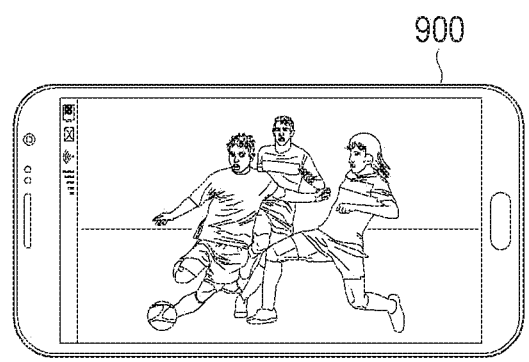
FIGS. 9, 10, 11, 12, 13, and 14 are views illustrating examples of a user interface window that may be displayed on a display unit of FIG. 3 according to an embodiment of the present disclosure.

In detail, FIG. 9 is an example of a user interface window displayed according to the driving of the user application. The user interface window 900 displays an image according to the driving result of the user selected application.

Figure 10:
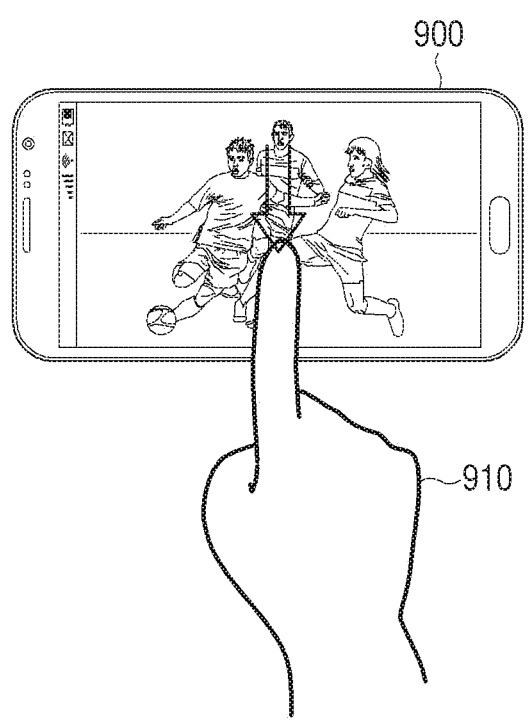

Referring to FIG. 9, here, when a request for experiencing the corresponding application is received from a user of the second terminal device 200, the user of the first terminal device 100 may input a control command for providing streaming of the corresponding application. In detail, the user of the first terminal device 100 may perform a preset touch scroll 910 for displaying a control command window as illustrated in FIG. 10, and accordingly, a control command window as illustrated in FIG. 11 may be displayed.

Figure 11:
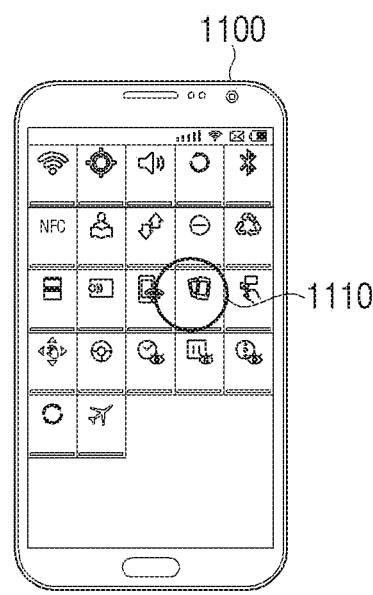

FIG. 11 is a view illustrating an example of a control command window for receiving a command for providing streaming.

Referring to FIG. 11, a user interface window 1100 may display a plurality of control command items, and one item 1110 among the displayed control command items is a region for receiving a command (for example, S-beam) for providing image data regarding a corresponding application to the second terminal device 200 in a streaming manner. Meanwhile, selection of the second terminal device 200 to which image data is to be transmitted may be performed through an NFC tag.

Thus, when the first terminal device 100 is tagged with the second terminal device 200 through NFC, a link for wireless communication with the second terminal device 200 may be established.

When the link is established, the first terminal device 100 may stream image data to the second terminal device 200. In this case, a user interface window illustrated in FIG. 12 may be displayed in the second terminal device 200.

Figure 12:
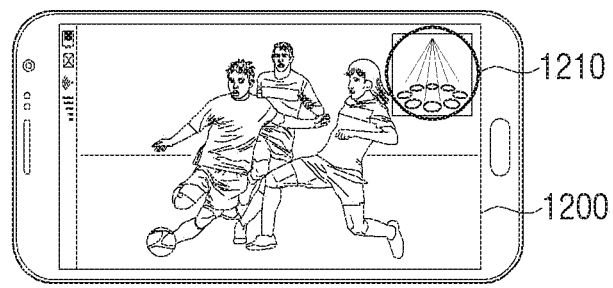

FIG. 12 is a view illustrating an example of a user interface window that may be displayed in a terminal device provided with streaming.

Referring to FIG. 12, the user interface window 1200 displays streamed image data, and an icon for authentication from the server 300 is displayed together at one side of the user interface window 1200.

Figure 13:
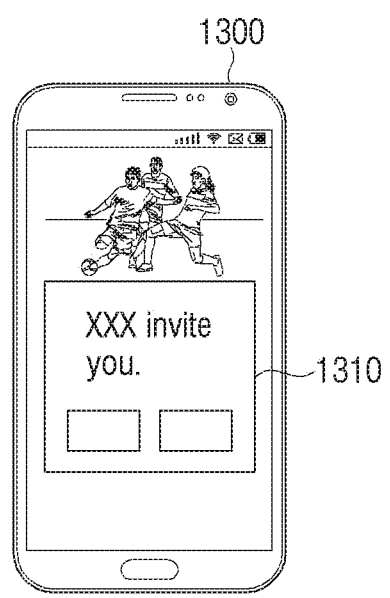
Figure 14:
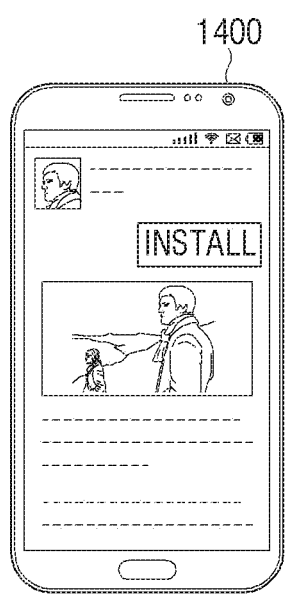

When the corresponding application needs to be installed, the user may select the displayed icon 1210. In the present embodiment, the second terminal device 200 that receives and displays streaming may receive an installation file from the first terminal device 100 providing streaming or the server 300 in advance, and when a user's installation command is input after the installation file is completely received, a user interface window for authenticating the corresponding installation file may be displayed as illustrated in FIG. 13. On the other hand, when the user's installation command is input before the installation file is completely received, a user interface window displaying a web page corresponding to the application as illustrated in FIG. 14 may be displayed.

FIG. 13 is a view illustrating an example of a user interface window for authenticating a previously received installation file.

Referring to FIG. 13, a user interface window 1300 includes an information input region 1310 for authentication of an installation file.

In detail, when a user's installation command is input after the installation file is completely received, the user interface window 1300 for receiving information for authenticating the previously received installation file may be displayed. The user may perform authentication by inputting his or her authentication code or by inputting payment account information or log-in information through the corresponding user interface window 1300.

FIG. 14 is a view illustrating an example of a user interface window for receiving an installation file.

Referring to FIG. 14, a user interface window 1400 displays a web page for receiving and authenticating an installation file.

In detail, when a user's installation command is input before an installation file is completed received, the user interface window 1400 may display a web page provided from the server 300 for receiving the installation file and authenticating the installation file.

Figure 15:
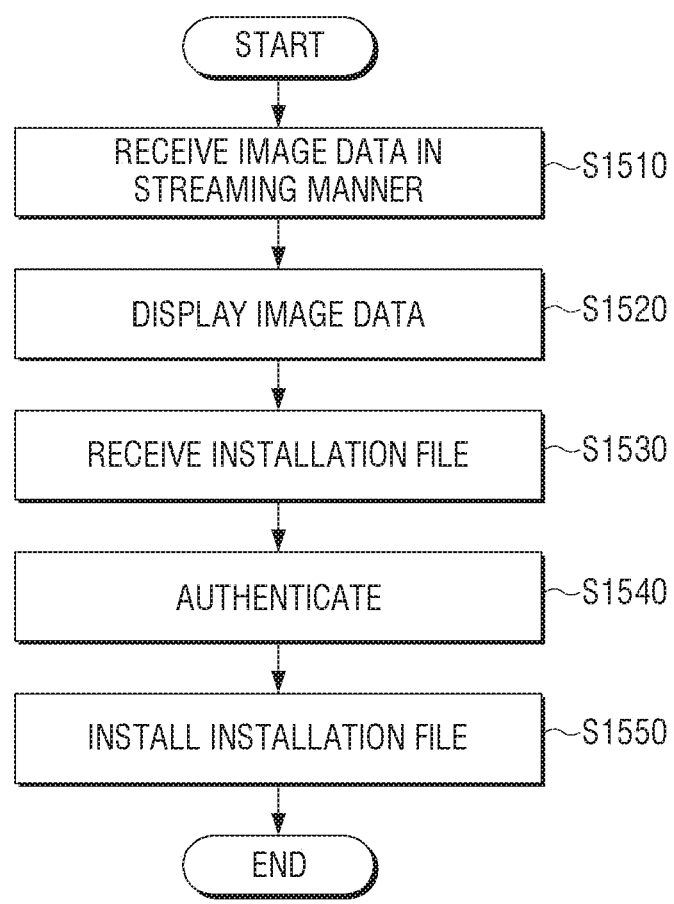
FIG. 15 is a view illustrating a control method according to an embodiment of the present disclosure.

FIG. 15 is a view illustrating a control method according to a first embodiment of the present disclosure. In detail, the control method according to the control method according to a first embodiment of the present disclosure is a control method in the terminal device operated as the second terminal device 200 of FIG. 1. In this case, the other terminal device may correspond to the first terminal 100 device of FIG. 1.

Referring to FIG. 15, first, streaming of an application may be requested from the other terminal device. Here, the terminal device has a history of performing streaming of the corresponding application with the other terminal device or another terminal device, the terminal device may transmit a streaming request including the progress history information to the other terminal device.

The terminal device receives streamed image data of an application installed in the other terminal device from the other terminal device at operation S1510. In detail, in response to the aforementioned streaming request, streaming of the image data may be received from the other terminal device in a P2P manner.

The received image data is displayed at operation S1520. In detail, the image data received in a streaming manner may be displayed. Here, an icon for authentication (specifically, a server connection icon for purchasing an application) may be displayed together at one side of the user interface window displaying the image data.

When a manipulation command regarding the corresponding image data is input from the user while the image data is being displayed, the received manipulation command may be transmitted to the other terminal device. In response, the other terminal device may generate image data corresponding to the received manipulation command and stream the generated image data. Also, the other terminal device may store information regarding a progress process regarding the image data, as progress history information.

While the image data is being displayed, an installation file associated with an application is received and stored at operation S1530. In detail, while the aforementioned image data is being displayed (or the streamed image data is being received), an installation file associated with the application may be received through the other terminal device or the server. Meanwhile, in a case in which the installation file is received through the other terminal device, the installation file may be received in a P2P manner, and in a case in which the installation file is received through the server, the installation file may be received in a network communication manner.

Authentication is performed on the installation file at operation S1540. In detail, payment information is transmitted to a server that sells an application, to perform authentication.

When authentication on the installation file is completed, the received installation file is installed at operation S1550.

Meanwhile, after the installation file is stored, if authentication is not performed thereon until a preset period of time has lapsed, the installation file may be deleted.

In the control method according to the present embodiment, even though an application is not installed in the terminal device, image data according to the driving of the application may be streamed from the other terminal device and experienced. Also, while image data is being streamed, an installation file used for installing the application may be received in advance, and thus, the user may easily install the application without having to separately perform a downloading operation. The control method as illustrated in FIG. 15 may be executed in a terminal device having the configuration of FIG. 3, and may also be executed in a terminal device having another configuration.

Also, the aforementioned control method may be implemented as a program including an executable algorithm that may be executed in a computer, and the program may be stored in a non-transitory computer readable medium and provided.

The non-transitory computer readable medium refers to a medium that semi-permanently stores data and that may be read by a device, rather than a medium that stores data for a short period of time such as a register, a cache, or a memory. In detail, the aforementioned various applications or programs may be stored in a non-transitory computer readable medium such as a compact disc (CD), a digital versatile disc (DVD), a hard disk, a Blu-ray disk, a USB, a memory card, or a read-only memory (ROM) and provided.

Figure 16:
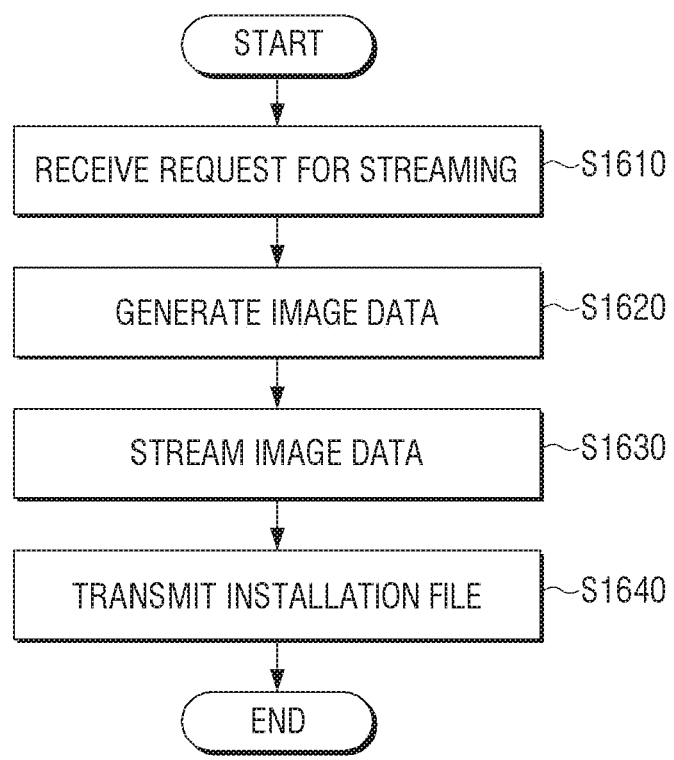
FIG. 16 is a view illustrating a control method according to an embodiment of the present disclosure.

FIG. 16 is a view illustrating a control method according to a second embodiment of the present disclosure. In detail, the control method according to the first embodiment of the present disclosure is a control method in the terminal device operated as the first terminal device 100 of FIG. 1. In this case, the other terminal device may correspond to the second terminal device 200 of FIG. 1.

Referring to FIG. 16, first, a streaming request regarding a previously installed application may be received from the other terminal device at operation S1610. In detail, a streaming request regarding an application previously installed in the terminal device may be received from the other terminal device. Here, the streaming request may include progress history information regarding the corresponding application. Meanwhile, when implemented, a conformation as to whether to provide streaming to the other terminal device is okay may be obtained from the server storing an application and a follow-up process may be performed.

Image data is generated by driving the application at operation S1620. In detail, when the progress history information is received from the other terminal device, image data according to the received progress history information may be generated. Also, when manipulation information is received from the other terminal device, image data according to the manipulation command may be generated.

Meanwhile, when the terminal device streams image data in a mirroring manner as illustrated in FIG. 4, first image data to be displayed in the terminal device and second image data to be displayed in the other terminal device may be simultaneously generated. Here, the generated first image data may be displayed in the terminal device.

Meanwhile, in a case in which the terminal device provides streaming to a plurality of devices as illustrated in FIG. 8, a plurality of image data may be generated.

The generated image data is streamed to the other terminal device at operation S1630. In detail, the image data generated during the previous process may be streamed to the other terminal device in a P2P manner.

While the image data is being streamed, a previously stored installation file associated with an application is transmitted to the other terminal device at operation S1640. In detail, the previously stored installation file may be transmitted to the other terminal device in a P2P manner in parallel with the process of generating the aforementioned image data and streaming the generated image data. Meanwhile, when the terminal device does not have an installation file, the terminal device may generate an installation file using files of an application stored in the storage unit and transmit the generated installation file to the other terminal device.

Meanwhile, as illustrated in FIG. 8, when the terminal device provides streaming to a plurality of terminal devices, the terminal device may stream single image data to each of the plurality of terminal devices or may stream a plurality of image data to the plurality of terminal devices, respectively.

In the control method according to the present embodiment, since image data according to the driving of an application is provided in a streaming manner to a terminal device without an application, the other terminal device may experience the application installed in the terminal device, without having to install it. The control method illustrated in FIG. 16 may be executed in a terminal device having the configuration of FIG. 3 and may also be executed in a terminal device having other configuration.

Also, the aforementioned control method may be implemented as a program including an executable algorithm that may be executed in a computer, and the program may be stored in a non-transitory computer readable medium and provided.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. An electronic device comprising:
   a transceiver;
   a memory configured to store an installation file of an application which is installed at the electronic device; and
   at least one processor configured to, in response to receiving a streaming request from an external device:
      control the transceiver to stream image data generated according to an execution of the application, and
      transmit the installation file of the application to the external device.

2. The electronic device of claim 1, wherein the at least one processor is further configured to control the transceiver to transmit the installation file of the application to the external device while the image data is being streamed.

3. The electronic device of claim 1, further comprising:
   a display configured to display the image data.

4. The electronic device of claim 3, further comprising:
   a input unit configured to receive a user input,
   wherein the at least one processor is further configured to:
      generate first image data corresponding to the user input and second image data corresponding to the streaming request,
      control the display to display the first image data, and
      control the transceiver to stream the second image data to the external device.

5. The electronic device of claim 1, wherein the at least one processor is further configured to, in response to receiving a user input from the external device:
   generate an image data according to the user input, and
   control the transceiver to stream to the external device, the image data generated according to the user input.

6. The electronic device of claim 5, wherein the user input is input to the external device while the external device displays the image data received from the electronic device.

7. A method for controlling an electronic device which stores an installation file of an application which is installed at the electronic device, the method comprising:
   receiving a streaming request from an external device; and
   in response to receiving the streaming request:
      streaming image data generated according to an execution of the application to the external device, and
      transmitting the installation file of the application to the external device.

8. The method of claim 7, wherein the transmitting transmits the installation file of the application to the external device while the image data is being streamed.

9. The method of claim 7, further comprising:
   displaying the image data.

10. The method of claim 9, further comprising:
    generating first image data corresponding to a user input and second image data corresponding to the streaming request; and
    displaying the first image data and streaming the second image data to the external device.

11. The method of claim 7, further comprising:
    in response to receiving a user input from the external device, generating image data according to the user input and streaming the image data generated according to the user input to the external device.

12. The method of claim 11, wherein the user input is input to the external device while the external device displays the image data received from the electronic device.

* * * * *